(12) United States Patent
Bochert et al.

(10) Patent No.: US 12,000,761 B2
(45) Date of Patent: Jun. 4, 2024

(54) EMERGENCY SHOWER TEST DEVICE

(71) Applicant: Alfred-Wegener-Institut, Helmholtz-Zentrum fuer Polar—und Meeresforschung, Bremerhaven (DE)

(72) Inventors: Thore Bochert, Bremerhaven (DE); Johannes Lemburg, Salem (DE)

(73) Assignee: ALFRED-WEGENER-INSTITUT, HELMHOLTZ-ZENTRUM FUER POLAR—UND MEERESFORSCHUNG, Bremerhaven (DE)

( * ) Notice: Subject to any disclaimer, the term of this patent is extended or adjusted under 35 U.S.C. 154(b) by 148 days.

(21) Appl. No.: 17/798,894

(22) PCT Filed: Feb. 12, 2021

(86) PCT No.: PCT/DE2021/100141
§ 371 (c)(1),
(2) Date: Aug. 11, 2022

(87) PCT Pub. No.: WO2021/164823
PCT Pub. Date: Aug. 26, 2021

(65) Prior Publication Data
US 2023/0097427 A1 Mar. 30, 2023

(30) Foreign Application Priority Data
Feb. 21, 2020 (DE) ...................... 10 2020 104 591.3

(51) Int. Cl.
*G01M 99/00* (2011.01)
*A47K 3/28* (2006.01)
(52) U.S. Cl.
CPC ........... *G01M 99/008* (2013.01); *A47K 3/286* (2013.01)

(58) Field of Classification Search
CPC .......... A47K 3/28; A47K 3/286; A61H 35/02; G01F 13/00; G01F 13/006; G01F 19/00;
(Continued)

(56) References Cited

U.S. PATENT DOCUMENTS 4,245,666 A * 1/1981 Norris ..................... E04G 21/30
248/94
5,140,714 A * 8/1992 Horenstein ............. E03B 1/048
4/596
(Continued)

FOREIGN PATENT DOCUMENTS

DE 202009016338 U1 6/2010
DE 102015106857 B4 5/2018
(Continued)

*Primary Examiner* — Herbert K Roberts
*Assistant Examiner* — Anthony W Megna Fuentes
(74) *Attorney, Agent, or Firm* — LEYDIG, VOIT & MAYER, LTD.

(57) ABSTRACT

An emergency shower test device for testing an emergency shower includes: a collection container; an inlet pipe, which has at an upper end thereof a receiving section for a head of the emergency shower, which opens at a lower end thereof into the collection container and which is vertically adjustable by a lockable adjusting device, the inlet pipe being largely retractable into the collection container; a drainage system arranged in a lower region of the collection container for emptying the collection container; and a frame in which the collection container is arranged in an elevated position. The receiving section of the inlet pipe is integrated into the upper end of the inlet pipe. The inlet pipe has a constant diameter for fully accommodating the head of the emergency shower, the adjusting device including a reversed rope with a counterweight adapted to a weight of the inlet pipe.

13 Claims, 6 Drawing Sheets

(58) Field of Classification Search
CPC .... G01F 25/00; G01F 25/0087; G01F 25/009; G01F 23/00; G01M 99/008
See application file for complete search history.

(56) References Cited

U.S. PATENT DOCUMENTS

| | | | | |
|---|---|---|---|---|
| 6,845,784 | B2 * | 1/2005 | Pascznk | ........ A62C 99/00 |
| | | | | 285/8 |
| 2017/0135529 | A1 * | 5/2017 | Joyer | ........ A61H 35/00 |
| 2018/0052020 | A1 | 2/2018 | Davis | |
| 2019/0301982 | A1 | 10/2019 | Bai et al. | |

FOREIGN PATENT DOCUMENTS

| | | | |
|---|---|---|---|
| SG | 182123 | A1 | 7/2012 |
| WO | WO 2004/071263 | A1 | 8/2004 |

* cited by examiner

EMERGENCY SHOWER TEST DEVICE

CROSS-REFERENCE TO PRIOR APPLICATIONS

This application is a U.S. National Phase application under 35 U.S.C. § 371 of International Application No. PCT/DE2021/100141, filed on Feb. 12, 2021, and claims benefit to German Patent Application No. DE 10 2020 104 591.3, filed on Feb. 21, 2020. The International Application was published in German on Aug. 26, 2021 as WO/2021/164823 A1 under PCT Article 21(2).

FIELD

The invention relates to an emergency shower test device, comprising a collection container and an inlet pipe which has at its upper end a receiving section for the head of an emergency shower to be tested, which opens at its lower end into the collection container and which is designed to be vertically adjustable by means of a lockable adjusting device whereby the inlet pipe is largely retractable into the collection container, and comprising a drainage system arranged in the lower area of the collection container for emptying the collection container.

BACKGROUND

In some facilities, employees can be exposed to the risk of burns, scalds or chemical burns. In particular, when handling hazardous substances, accidental contamination of humans can occur despite all safety measures. In order to be able to remove such contamination immediately, emergency showers are used. These can be stationary or mobile systems with a single function (for the whole body—water jet is directed downwards, for the eyes only—water jet is directed upwards) or a combined function. Water can be supplied from storage tanks or from pipes. In general, all emergency showers have in common that they are rarely used. However, in the event of an emergency, these showers must be ready for immediate and reliable use. For this reason, emergency showers must be inspected regularly to ensure that they are fully functional, this is stipulated by legal regulations and standards. This involves testing various parameters of the outflowing water (for example, volume flow, temperature, purity, bacterial content), for the purpose of which a test apparatus is used. Various suppliers of such emergency shower test devices are available on the market.

A mobile emergency shower test device, which represents the closest prior art to the invention, is disclosed in DE 20 2009 016 338 U1. Described is an assembly comprising a transparent collection container arranged on a rollable base plate. The collection container is closed at its upper end face, where it accommodates an inlet pipe. The inlet pipe can be height-adjusted by means of a lockable adjusting device. To do this, a compression fitting is loosened in the region of the front side of the collection container, the inlet pipe is gripped by hand around its circumference and pushed up or down to the desired height. It is then locked in this position by means of the compression fitting. The height to be set depends on the installation height of the shower head of the emergency shower to be tested. For transportation of the test apparatus, the inlet pipe can be retracted almost completely into the collection container. To ensure that the shower head is accommodated with as little splash water as possible, the known test device has a receiving section in the form of a funnel to accommodate the head of the emergency shower to be tested at the upper end of the inlet pipe, which itself has a relatively small diameter. A pump is arranged in the lower part of the collection container, by means of which the collected water is pumped out. The closed design of the collection container requires the provision of a vent system.

From US 2019/0301982 A1 a height-adjustable emergency shower test device is known, in which a basin-like container is arranged as a receiving section on a first shaft. The first shaft is telescopically guided in a hollow, second shaft. The height is adjusted by means of a clamping screw on the second shaft, which is guided in an elongate hole on the first shaft. A similar test apparatus is known from US 2018/0052020 A1. Here, the receiving section is designed as a funnel, comprising a pipe connection piece. This is vertically adjustable along a second pipe. The height is fixed by clamping levers on the pipe connection piece.

WO 2004/071263 A1 describes an emergency shower test device with a curtain instead of an inlet pipe. The curtain runs on a circular rail which is adjustable in height and completely surrounds the emergency shower in a cylindrical manner when testing is carried out.

Finally, a test device for an eye shower is known from DE 10 2015 106 857 B4, in which a cover is used to prevent any splashing of the upwardly directed water jet. In the case of eye showers, the spray pattern must also be inspected on a regular basis.

SUMMARY

In an embodiment, the present invention provides an emergency shower test device for testing an emergency shower, comprising: a collection container; an inlet pipe, which has at an upper end thereof a receiving section for a head of the emergency shower, which opens at a lower end thereof into the collection container and which is vertically adjustable by a lockable adjusting device, the inlet pipe being largely retractable into the collection container; a drainage system arranged in a lower region of the collection container and configured to empty the collection container; and a frame in which the collection container is arranged in an elevated position, wherein the receiving section of the inlet pipe is integrated into the upper end of the inlet pipe, wherein the inlet pipe has a constant diameter configured to fully accommodate the head of the emergency shower, the adjusting device comprising a reversed rope with a counterweight adapted to a weight of the inlet pipe, and wherein the drainage system is operated by gravity.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
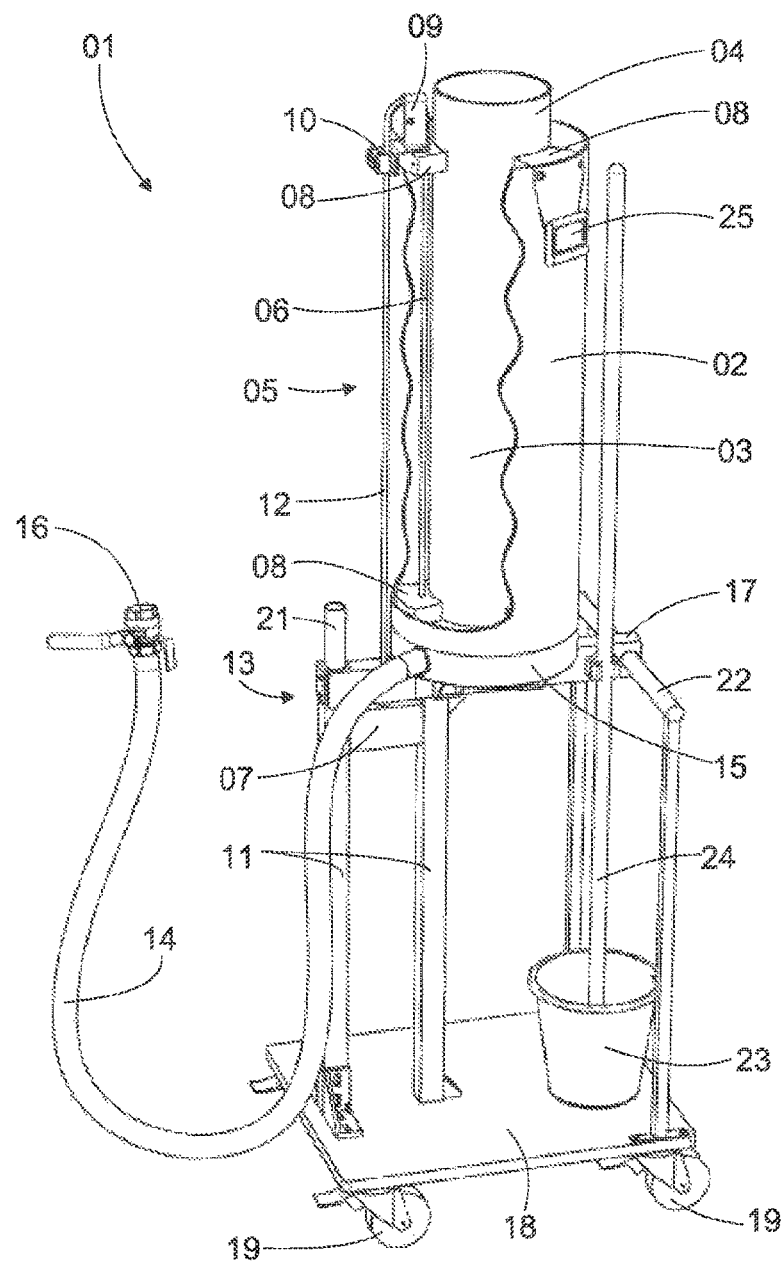
FIG. 1 shows a perspective front view with retracted inlet pipe.

In an embodiment, based on the generic emergency shower test device according to the prior art described above, the present invention provides further develops this device in such a way that it can be handled easily without great effort and with the greatest possible spray safety.

According to the invention, it is provided that the emergency shower test device has the receiving section integrated into the upper end of the inlet pipe, wherein the inlet pipe has a diameter that is large enough to fully accommodate the head of the emergency shower, wherein the adjusting device comprises a reversed rope with a counterweight adapted to the weight of the inlet pipe, and wherein a frame is provided in which the collection container is arranged in an elevated position, wherein the drainage system is operated solely on the basis of gravity.

The emergency shower test device by the invention has an inlet pipe with a diameter large enough to fully accommodate any shower head. This avoids the need for heavy, bulky elements, such as funnels or curtains. The inlet pipe is stable—even when extended. Large funnels in particular, which are screwed onto relatively thin inlet pipes, lead to instability problems when the inlet pipe is extended. Furthermore, they impede the view, are an obstruction and are difficult to handle due to their weight. This is significantly improved in the invention by an adjusting device comprising a reversed rope and a counterweight. In this way, adjustment of the height of the inlet pipe no longer requires displacement of the pipe's own weight. Instead, this is compensated for by the counterweight, which is adapted to the weight of the inlet pipe. Manual displacement can be effected by pulling, largely without the application of a force, the rope up or down on the outside of the collection container. The latter is arranged in a frame in an elevated position. The collected water can thus be easily drained off via the drainage system in the lower region of the collection container. The driving force is exclusively gravity. A bilge pump or electric pump and a battery or power connection are not required. By means of the aforementioned features, a completely self-sufficient test trolley for emergency showers is made available, which is particularly easy to handle. In particular, neither a great expenditure of force nor electrical energy is required for operation.

The integrated receiving section at the upper end of the inlet pipe is to accommodate the complete shower head. Thus, the height positioning of the inlet pipe depends on the installation height or arrangement of the shower head in the case of full-body emergency showers. As a rule, the installation height or arrangement is such that the inlet pipe can be formed in one piece. In the fully extended state, the shower head can then be accommodated by the integrated receiving section thereof. To reach greater shower head installation heights, however, it is advantageous and preferred if, according to a first modification of the inventive test device, the inlet pipe is made up of at least two concentric partial pipes which are telescopically extendable and retractable, the inner partial pipe comprising the receiving section and the rope of the adjusting device being connected to both partial pipes. The two partial pipes are retracted and extended together via the adjusting device. Due to the counterweight, the weight of which is adapted to the weight of the inlet pipe and thus also to the two partial pipes which together form the inlet pipe, no great force has to be applied to the adjusting device. When fully extended, emergency shower heads at a particularly great installation height can be reached, enclosed and inspected. When extended, the receiving section is located in the uppermost partial pipe, the diameter of which is dimensioned accordingly. In the retracted state, all partial pipes are inserted into each other and are arranged in the region of the collection container, thus maintaining the compact design of the test device for transportation and storage.

A further feature contributing to the compact design is that the collection container is easily able to accommodate the inlet pipe. According to a further embodiment of the invention, it is advantageous and preferred if the collection container is cylindrical and open at its upper end. The volume of the collection container should be dimensioned so that it can reliably hold the water collected from at least one test procedure. Preferably, the water of several test procedures can be collected, to avoid the need to empty the tank after each test procedure. As the collection container is open at the top, it is also not necessary to provide special vent means. Ambient pressure always prevails inside the collection container.

Since the test device is to be as compact and light as possible, components are used which belong in the realm of lightweight construction. The inlet pipe is thin-walled and made of plastic. In order to nevertheless achieve good mechanical stability during extension and retraction, it is preferred and advantageous if, according to a further embodiment of the invention, sliding and centering blocks are arranged between the inlet pipe and the collection container. In this way, the inlet pipe and collection container can be guided concentrically to one another without tilting or jamming. At the same time, good sliding is achieved. Furthermore, the blocks can also be used as a stop to prevent the inlet pipe from being inadvertently entirely pulled out of the collection container. Likewise, when using an inlet pipe consisting of several concentric partial pipes, it is advantageous and preferred for the same reasons to arrange sliding and centering blocks between the latter as well. More details can be derived from the embodiments of the invention.

For the test device to be used in a largely splash-proof manner, the invention requires that the shower head can be fully accommodated in the integrated receiving section in the inlet pipe. In particular, when the shower head is installed at a greater height, it is not always easy to check whether it is correctly positioned and entirely enclosed. Therefore, according to a further modification of the invention, it is preferred and advantageous if at least the receiving section integrated in the inlet pipe is transparent. The integrated receiving section can then be easily observed from the floor and slid fully over the shower head. At the same time, the incoming water can also be observed for its jet pattern and for its color and consistency (water quality). To further improve visibility, the entire inlet pipe or its partial pipes can be made fully transparent. Furthermore, it is also advantageous and preferred if the collection container is at least partially transparent. The collected water can then be examined, for example through an observation window, with respect to the water level in the collection container and for turbidity and color (water quality). In particular, if the collection container is completely transparent, the fill level in the container can be monitored particularly easily, for example with a simple scale on the collection container. Suitable plastic pipes and containers are commercially available.

The test device by the invention does not require any great expenditure of force in order to accommodate the shower head into the receiving section of the inlet pipe. This is accomplished by means of an adjusting device comprising a reversed rope and a counterweight, the weight of the counterweight matching the weight of the inlet pipe. The user can, for example, grab the inlet pipe with both hands and slide it upwards out of the collection container without any application of force. An even simpler solution is achieved, when according to a further development of the invention, it is preferably and advantageously provided that the rope of the adjusting device serves as a handle for vertical adjustment of the inlet pipe and/or that it can be clamped by means of a curry clamp. The rope runs along the outside of the collection container. It can be easily gripped and pulled up or down and thus also serves as a handle for vertical adjustment. Due to the transparent design, even inexperienced operators can understand and utilize the principle of operation. When the inlet pipe is in an extended state, the rope can preferably and advantageously be locked in place by means of a simple curry clamp (also known as a cam cleat in sailing). These types of clamps have two jaws with inclined retaining cams, the jaws facing each other and forming a narrowing slot between them. Clamping occurs automatically as the inlet pipe is pulled out and the rope is continuously pulled through the curry clamp. In the extended state of the inlet pipe, clamping prevents it from being inadvertently pushed down again by water friction or the like thereby causing water to leak. To retract the inlet pipe, the rope is removed from the curry clamp and released. No securing is required when the inlet pipe is in the retracted state, since the curry clamp only clamps the rope in one direction of pull.

The counterweight is matched in terms of weight to the inlet pipe to be adjusted so that almost complete weight compensation can be achieved. It is preferable and advantageous if the counterweight can be moved vertically between guide rails on the frame. As a result, the counterweight is safely guided and no interference arises from swinging movements caused by the weight. The rope cannot become entangled. Furthermore, in the test device by the invention, it can be provided that the drainage system comprises a drain hose having a large diameter and a shut-off valve at its free end. The large diameter allows the water to freely drain from the collection container, for example into a floor drain into which the open end of the hose is held. To ensure that the water is retained until the hose has been inserted into the floor drain, a shut-off valve, for example a ball valve, can be provided at the open end of the hose. In this way, the hose can be easily closed or opened at this end.

According to a further embodiment of the invention, it may also preferably and advantageously be provided that the frame comprises a base plate with lockable swivel castors, a further handle and various holders for further equipment and information material. The swivel castors and the additional handle enable optimal maneuvering of the test device, so that even hard-to-reach places can be easily accessed. The locking of the swivel castors ensures safe positioning underneath the shower head during testing operation. Finally, further holders can be provided on the frame, for example for a measuring jug, a mop, a bucket, the shut-off valve of the drain hose or for information material on how to operate the test device or to provide information on the legal requirements of functional inspection or the like. Further details can also be found in the exemplary embodiments.

A relevant test parameter is in particular the volumetric flow of water exiting the tested emergency shower. For this purpose, it is advantageous if a timer and a fill level indicator are arranged on the collection container. On the basis of the measured time and the volume of water determined directly via the fill level indicator, the volumetric flow rate can be easily determined and compared with the legal requirements.

The explanations given above refer primarily to the testing of whole-body emergency showers. However, the test device by the invention can also be used to test eye showers. In this case, the water jet is directed upwards (into the eyes of the user positioned above the shower). In particular, in the case of this type of emergency shower, the spray pattern also has to be assessed. This is achieved in the test device by the invention by simply holding the eye shower manually in the receiving section of the (non-extended) inlet pipe or placing it on a screen. To avoid the water splashing beyond the inlet pipe, it is preferred and advantageous if a cover is provided for the receiving section integrated in the inlet pipe. This is simply held over the eye shower positioned in the inlet pipe and ensures reflection of the sprayed water into the interior of the inlet pipe. Since eye showers often only have a very short connection hose, an eye shower test can alternatively be simply carried out using the measuring jug preferably provided with the test device in the invention. The measuring jug is simply held over a wash basin above the upwardly spraying eye shower and the water spray pattern is inspected. Subsequently, the sprayed water is filled into the measuring jug for a predetermined period of time and the volume of water is checked. Further details of the above-described modifications of the invention can be derived from the following exemplary embodiments.

FIG. 1 schematically shows a perspective view of an emergency shower test device 01, comprising a collection container 02 and an inlet pipe 03 with its lower end opening into the collection container 02. The inlet pipe 03 is fully retracted. Collection container 02 and inlet pipe 03 are cylindrical and made entirely of transparent plastic material. The collection container 02 is open at its upper end and closed at its lower end. The inlet pipe 03 is open at both ends. The collection container 02 is depicted partly broken away to better show the inlet pipe 03, which is depicted in the retracted state. As can be seen, the inlet pipe 03 is almost completely surrounded by the collection container 02 in this state, resulting in a very compact arrangement that is easy to transport and store. At its upper end, the inlet pipe 03 has an integrated receiving section 04 to accommodate the head of an emergency shower to be tested (shown in FIG. 2). The diameter of the receiving section 04 or of the inlet pipe 03 is large enough to fully surround the shower head. Lateral leakage of spray water is thus completely avoided.

The inlet pipe 03 is arranged on the collection container 02 in a height-adjustable manner by means of an adjusting device 05. For this purpose, the adjusting device 05 comprises a reversed rope 06 and a counterweight 07 which is adapted to the weight of the inlet pipe 03. When the inlet pipe 03 is fully retracted, the counterweight 07 is at its highest position. A plurality of sliding and centering blocks 08 are arranged on the inlet pipe 03. In the exemplary embodiment shown, three sliding and centering blocks 08 are evenly arranged on the circumference of the inlet pipe 03 in its lower region. Furthermore, three sliding and centering blocks 08 are evenly arranged on the inside of the collection container 02 in its upper region. The sliding and centering blocks 08 provide concentric alignment of the collection container 02 and inlet pipe 03 and ensure easy extension and retraction of the latter. The rope 06 is attached to one of the three sliding and centering blocks 08 of the inlet pipe 03 and is reversed over the edge of the collection container 02 via a reversing pulley 09 above the associated sliding and centering block 08 (axial alignment so that the rope 06 runs vertically) on the inside of the collection container 02. On the outside of the collection container 02, the rope 06 extends to the counterweight 07. A curry clamp 10 (cam cleat) is arranged in the area of the sliding and centering block 08 on the outside of the collection container 02, in which the rope 06 is automatically fixed when the inlet pipe 03 is extended. Extension (when the rope 06 is pulled down through the curry clamp 10) is assisted by the counterweight 07, which slides down under the influence of gravity. The rope 06 or inlet pipe 03 is securely fixed in the extended position by the downward-moving counterweight 07 and the curry clamp 10. To change the vertical position (retraction of the inlet pipe 03 into the collection container 02), the rope 06 is removed from the curry clamp 10. Once the inlet pipe 03 has been fully retracted into the collection container 02 (placed on the double bottom 15, see below), locking is no longer necessary. By its own weight, the inlet pipe 03 holds the counterweight 07 in its upper position. The counterweight 07 is securely vertically guided between two guide rails 11. To adjust the inlet pipe 03, whereby the rope 06 on the outside of the collection container 02 is used like a handle 12, no external energy input (muscle power, motor) is required. Extension of the inlet pipe 03 is assisted by the counterweight 07. The retraction of the inlet pipe 03 is assisted by its own weight.

In its lower region, the collection container 02 has a drainage system 13 for the purpose of emptying. This also operates solely by means of gravity. An electric pump is not required. In the exemplary embodiment shown, a drain hose 14 with a relatively large cross-section (free water drainage) is radially connected to a double bottom 15. The double bottom 15 forms the bottom of the collection container 02 and is provided with a central opening 16 (cf. FIG. 2). The water collected in the collection container 02 drains through this opening via the drain hose 13, for example into a floor drain (not shown). At its free end, the drain hose has a shut-off valve 16 (for example a ball valve) for opening and closing the drain hose 13. Since the collection container 02 is configured to be open at its upper end, the water runs out of the collection container 02 simply by the force of gravity without the need for any further venting means when the drain hose 13 is open.

To drain the collected water from the collection container 02 solely by gravitational force, it is necessary for the open (openable) end of the drain hose 13 to be located below the bottom of the collection container 02. The collection container 02 is therefore arranged in an elevated position in a frame 17. The free end of the drain hose 13 simply has to be held below the double bottom 15 to enable it to be fully drained.

Furthermore, a base plate 18 is shown in FIG. 1 as part of the frame 17. The base plate 18 is mounted on four lockable swivel castors 19. These enable the test device 01 to be easily maneuvered and fixed. A holder 21, for example for a measuring jug, and a further handle 22 for steering are also arranged laterally on the base plate 18. In addition, a bucket 23 and a mop 24 are provided on the base plate 18 for clearing up any floor puddles that may occur during the test. On the collection container 02, there is also a timer 25, which can be used to determine the outflow rate of the water from the emergency shower being tested.

Figure 2:
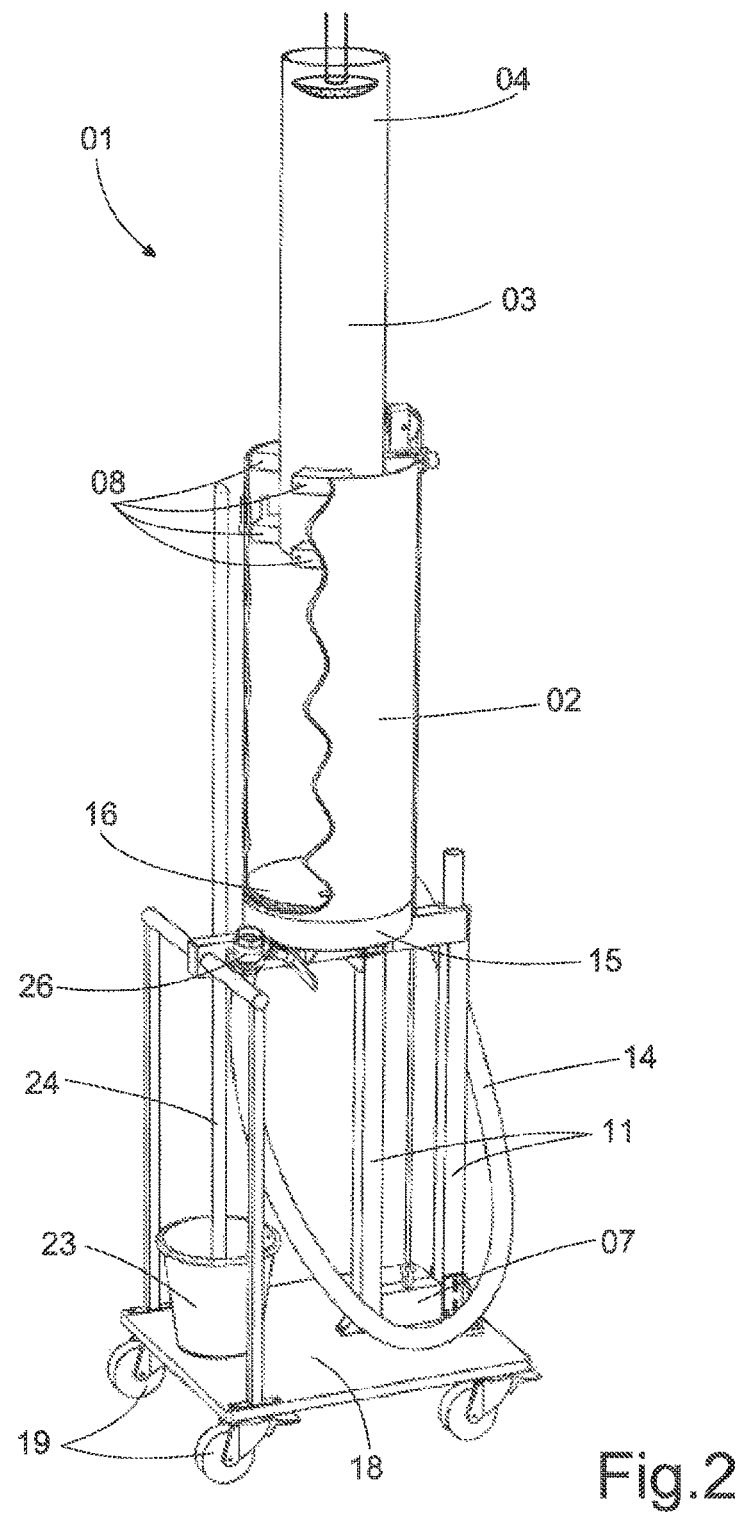
FIG. 2 shows a perspective rear view with extended inlet pipe.

FIG. 2 (reference numerals not mentioned here are to be derived from the other figures and the descriptions) shows the emergency shower test device 01 with a fully extended inlet pipe 03 (viewed from the rear opposite to FIG. 1). The counterweight 07 is in its lowest position. The test device 01 is moved to the emergency shower to be tested and positioned beneath the shower head (shown schematically). The inlet pipe 03 is then extended upwards until the receiving section 04 completely accommodates the shower head (shown schematically). After the test has been completed, the inlet pipe 03 is retracted again and the test device 01 is moved to the next emergency shower or to the emptying point.

In FIG. 2 it can be seen clearly that the sliding and centering blocks 08 also serve as a stop to prevent the inlet pipe 03 from being inadvertently completely pulled out of the collection container 02. Furthermore, another clamp 26 is shown in which the end of the drain hose 14 can be fixed when it is not in use. In this way, the drain hose 13 is securely fixed and tripping accidents are thus prevented.

Figure 3:
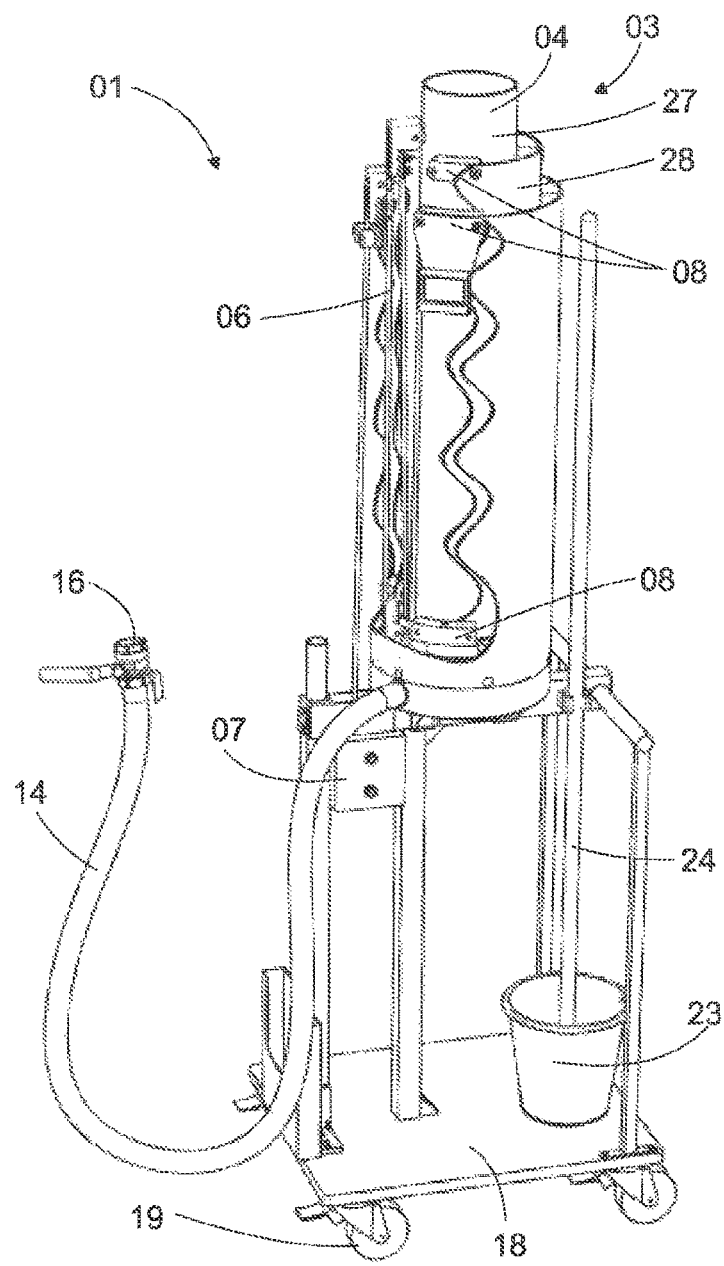
FIG. 3 shows a perspective front view with retracted inlet pipe consisting of two partial pipes.

FIG. 3 shows the test device 01 with a multi-part inlet pipe 03 in its retracted position. This is used to achieve greater extension heights. In the exemplary embodiment shown, the inlet pipe 03 consists of two partial pipes 27, 28, which can be extended and retracted telescopically. To achieve this, the inner partial pipe 27 extends concentrically in the outer partial pipe 28. Accordingly, the diameter of the inner partial pipe 27 is smaller than the diameter of the outer partial pipe 28. In the extended state (cf. FIG. 6), the inner partial pipe 27 is at the very top and accordingly carries the receiving section 04 for accommodating the shower head to be tested. Even if there are more than two partial pipes 27, 28, the innermost partial pipe 27 always carries the receiving section 04 and is the uppermost extended partial pipe 27. For concentric guiding and to assist sliding, centering and sliding blocks 08 are also provided between all partial pipes 27, 28. In the example shown, the sliding and centering blocks 08 between the partial pipes 27, 28 are arranged in the same manner as between the partial pipe 28 (corresponds to the inlet pipe 03 in a single-pipe configuration) and the collection container 02.

The rope 06 is correspondingly reversed several times. It always begins at the lower end of the innermost partial pipe 27, is then reversed a second time over the edge of the next outermost partial pipe 28 on its outer side in its lower region, and is then guided over its upper edge back down to the counterweight 07. If there are more than two partial pipes 27, 28, the rope 06 is reversed more frequently, but in the same manner. However, it is always firmly connected to each partial pipe 27, 28 at its lower edge. The counterweight 07 compensates for the weight of all partial pipes 27, 28 and is thus dimensioned larger than is the case with the one-piece design of the inlet pipe 03 according to FIGS. 1, 2.

Figure 4:
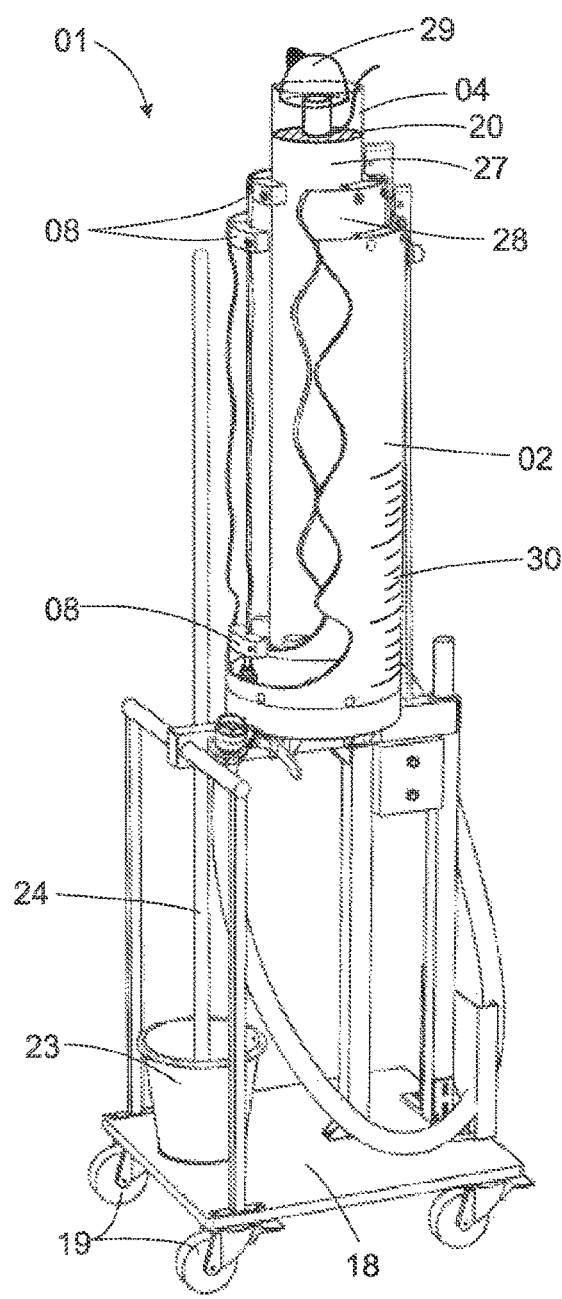
FIG. 4 shows a perspective rear view with retracted inlet pipe consisting of two partial pipes.

FIG. 4 shows the test device 01 with a two-part inlet pipe 03 consisting of partial pipes 27, 28 in the rear view in the retracted state. In addition, FIG. 4 shows a cover 29 which can be used for testing emergency eye showers (shown schematically). Since the latter spray upwards, the water is deflected back into the interior of the inlet pipe 03 via the cover 29 which is simply held manually over the receiving section 04. The emergency eye shower (shown schematically) can either be held into the receiving section 04 or placed on a grid 20, which can be inserted into the receiving section 04 for this purpose. Alternatively, a transparent measuring jug (volume approx. 3 Liters) which can be attached to the holder 21 can also be used to test an eye shower. Furthermore, FIG. 4 shows an analog fill level indicator 30 on the collection container 02. Electronic monitoring of the fill level is of course also possible.

Figure 5:
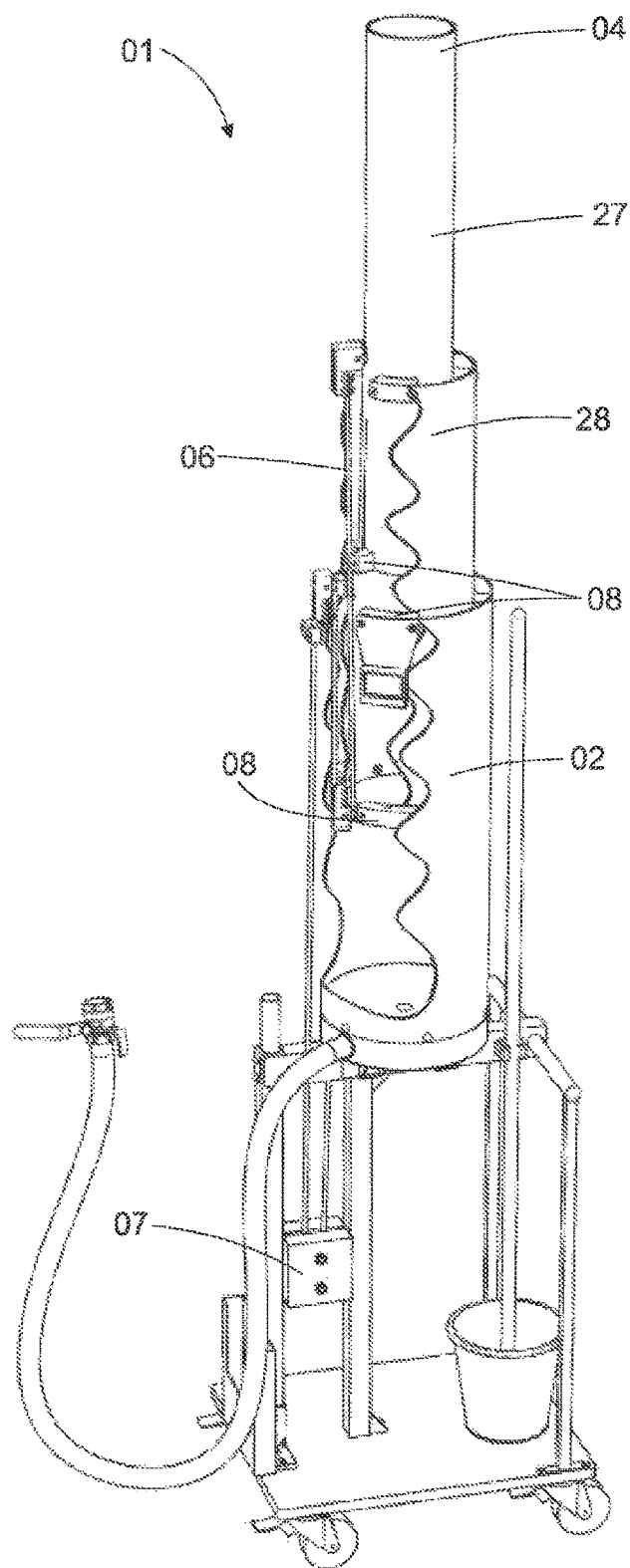
FIG. 5 shows a perspective front view with partially extended inlet pipe consisting of two partial pipes.
Figure 6:
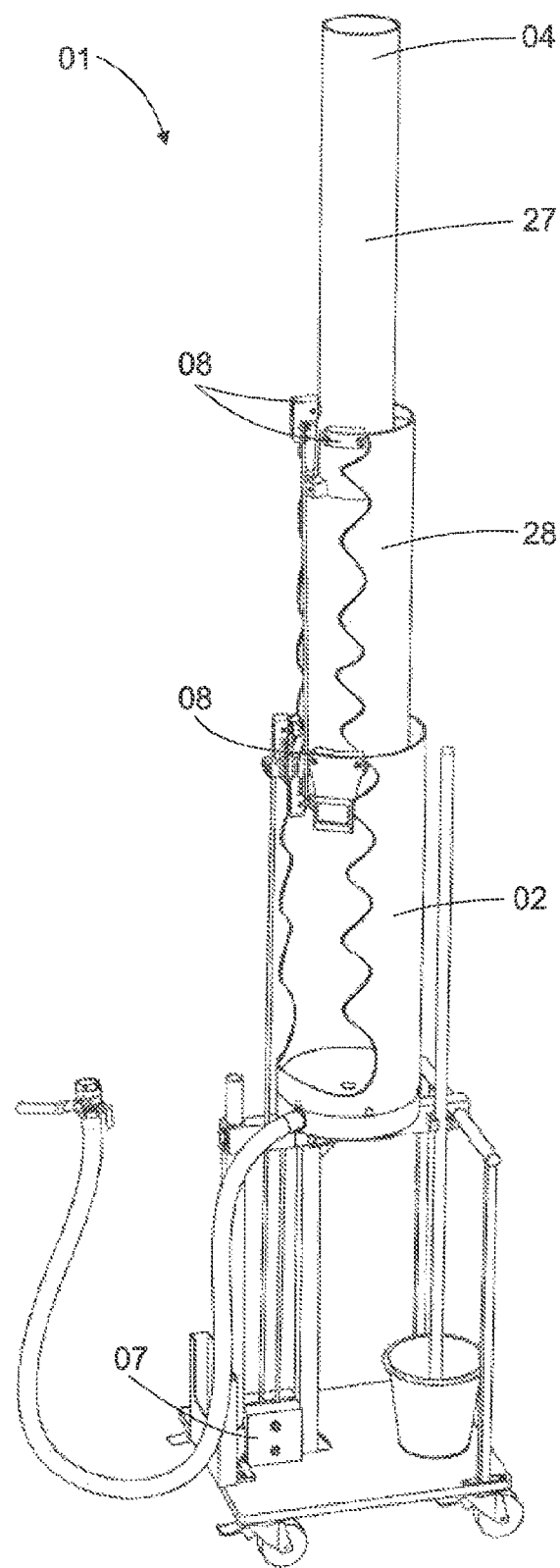
FIG. 6 shows a perspective front view with extended inlet pipe consisting of two partial pipes.

FIG. 5 shows the test device 01 with a two-part inlet pipe 03 consisting of partial pipes 27, 28 in a partially extended state. The counterweight 07 is in a half-way position. In FIG. 6, the two-part inlet pipe 03 is fully extended. The counterweight 07 is in its lowermost position. A considerable height can be reached by the innermost partial pipe 27 for positioning the receiving section 04, while still achieving good stability. In the retracted state, all partial pipes 27, 28 are again inside the collection container 02, so that the test device 01 according to the invention, in addition to being particularly simple and easy to operate, also remains very compact and easy to transport and store.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 01 emergency shower test device
02 collection container
03 input pipe
04 receiving section
05 adjusting device
06 rope
07 counterweight
08 sliding and centering block
09 reversing pulley
10 curry clamp
11 guide rail
12 handle
13 drainage system
14 drain hose
15 double bottom
16 shut-off valve
17 frame
18 base plate
19 swivel castor
20 grid
21 holder
22 further handle
23 bucket
24 mop
25 timer
26 clamp
27 inner partial pipe
28 further partial pipe
29 cover
30 fill level indicator

The invention claimed is:

1. An emergency shower test device for testing an emergency shower, comprising a collection container; an inlet pipe, which has an upper end thereof a receiving section for a head of the emergency shower, which opens at a lower end thereof into the collection container and which is vertically adjustable by a lockable adjusting device, the inlet pipe being retractable into the collection container; a drainage system arranged in a lower region of the collection container and configured to empty the collection container; and a frame in which the collection container is arranged in an elevated position, wherein the receiving section of the inlet pipe is integrated into the upper end of the inlet pipe, wherein the inlet pipe has a constant diameter configured to fully accommodate the head of the emergency shower, the lockable adjusting device comprising a reversed rope with a counterweight corresponding to a weight of the inlet pipe, and wherein the drainage system is operated by gravity.

2. The emergency shower test device of claim 1,
wherein
the inlet pipe comprises at least two concentric partial pipes which are telescopically retractable and extendable,
wherein an inner partial pipe of the at least two concentric partial pipes comprises the receiving section, and
wherein the reversed rope is connected to the at least two concentric partial pipes.

3. The emergency shower test device of claim 2,
further comprising:
sliding and centering blocks arranged between the inlet pipe and the collection container.

4. The emergency shower test device of claim 3,
wherein the
sliding and centering blocks are arranged between the at least two concentric partial pipes.

5. The emergency shower test device of claim 1,
wherein
the collection container is cylindrical and open at an upper end thereof.

6. The emergency shower test device of claim 1,
wherein
at least the receiving section integrated in the inlet pipe is transparent.

7. The emergency shower test device of claim 1,
wherein
the collection container is at least partially transparent.

8. The emergency shower test device of claim 1, wherein the reversed rope of the lockable adjusting device serves as a handle for adjusting a height of the inlet pipe and/or is lockable by a curry clamp.

9. The emergency shower test device of claim 8, wherein the frame comprises a base plate with lockable swivel castors, a further handle, and a plurality of holders for equipment and information material.

10. The emergency shower test device of claim 1,
wherein
the counterweight is arranged so as to be vertically displaceable between guide rails on the frame.

11. The emergency shower test device of claim 1, wherein the drainage system comprises a drain hose having a diameter and a shut-off valve at a free end thereof.

12. The emergency shower test device of claim 1, further comprising:
a timer and a fill level indicator arranged on the collection container.

13. The emergency shower test device of claim 1, further comprising:
a cover for the receiving section integrated in the inlet pipe.

* * * * *